US010178185B2

(12) United States Patent
Torok et al.

(10) Patent No.: US 10,178,185 B2
(45) Date of Patent: *Jan. 8, 2019

(54) LOAD-BALANCED, PERSISTENT CONNECTION TECHNIQUES

(71) Applicant: Amazon Technologies, Inc., Seattle, WA (US)

(72) Inventors: Fred Torok, Mercer Island, WA (US); Frederic Johan Georges Deramat, Bellevue, WA (US); Vikram Kumar Gundeti, Bellevue, WA (US); Peter Spalding VanLund, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,589

(22) Filed: May 8, 2017

(65) Prior Publication Data

US 2017/0244793 A1    Aug. 24, 2017

Related U.S. Application Data

(62) Division of application No. 13/858,753, filed on Apr. 8, 2013, now Pat. No. 9,781,214.

(51) Int. Cl.
*H04L 29/08* (2006.01)
*H04W 76/25* (2018.01)
(Continued)

(52) U.S. Cl.
CPC ........ *H04L 67/142* (2013.01); *H04L 61/1552* (2013.01); *H04L 61/2507* (2013.01);
(Continued)

(58) Field of Classification Search
CPC . H04L 67/1006; H04L 67/142; H04L 67/143; H04L 67/303; H04L 61/1552; H04L 61/2507
See application file for complete search history.

(56) References Cited

U.S. PATENT DOCUMENTS 5,805,804 A   9/1998 Laursen et al.
5,999,979 A   12/1999 Vellanki et al.
(Continued)

FOREIGN PATENT DOCUMENTS

JP    H08161248    6/1996
JP    2006085520   3/2006
(Continued)

OTHER PUBLICATIONS

Translated Japanese Office Action dated May 16, 2017 for Japanese Patent Application No. 2016-507592, a counterpart foreign application of U.S. Appl. No. 13/858,753, 11 pages.
(Continued)

*Primary Examiner* — Davoud A Zand
(74) *Attorney, Agent, or Firm* — Lee & Hayes, PC (57) ABSTRACT

Techniques for creating a persistent connection between client devices and one or more remote computing resources, which may form a portion of a network-accessible computing platform. This connection may be considered "permanent" or "nearly permanent" to allow the client device to both send data to and receive data from the remote resources at nearly any time. In addition, both the client device and the remote resources may establish virtual channels over this single connection. If no data is exchanged between the client device and the remote computing resources for a threshold amount of time, then the connection may be severed and the client device may attempt to establish a new connection with the remote computing resources.

20 Claims, 6 Drawing Sheets

(51) Int. Cl.
*H04L 29/06* (2006.01)
*H04L 29/12* (2006.01)
*H04L 12/28* (2006.01)

(52) U.S. Cl.
CPC ...... *H04L 67/1002* (2013.01); *H04L 67/1006* (2013.01); *H04L 67/1027* (2013.01); *H04L 67/143* (2013.01); *H04L 67/303* (2013.01); *H04L 69/14* (2013.01); *H04W 76/25* (2018.02); *H04L 12/2803* (2013.01); *H04L 67/145* (2013.01)

(56) References Cited

U.S. PATENT DOCUMENTS

| | | | |
|---|---|---|---|
| 6,934,752 B1* | 8/2005 | Gubbi | H04L 29/06027 370/392 |
| 7,287,082 B1 | 10/2007 | O'Toole, Jr. | |
| 7,324,544 B1* | 1/2008 | Gubbi | H04L 1/16 370/442 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 7,844,691 B2 | 11/2010 | Gopalakrishnan | |
| 7,852,831 B2 | 12/2010 | Akbar | |
| 8,024,441 B2 | 9/2011 | Kommula et al. | |
| 2002/0124100 A1* | 9/2002 | Adams | G06F 17/30902 709/232 |
| 2003/0140121 A1* | 7/2003 | Adams | G06F 17/30902 709/219 |
| 2003/0219030 A1* | 11/2003 | Gubbi | H04L 12/403 370/442 |
| 2003/0231621 A1* | 12/2003 | Gubbi | H04W 36/30 370/352 |
| 2005/0027818 A1* | 2/2005 | Friedman | H04L 29/06 709/217 |
| 2005/0262241 A1* | 11/2005 | Gubbi | H04L 1/16 709/225 |
| 2007/0136311 A1* | 6/2007 | Kasten | H04L 67/1008 |
| 2010/0095012 A1* | 4/2010 | Zuckerman | H04L 67/1097 709/231 |
| 2010/0281118 A1* | 11/2010 | Donahue | H04L 67/04 709/206 |
| 2010/0325306 A1 | 12/2010 | Vimpari et al. | |
| 2011/0060801 A1 | 3/2011 | Virk et al. | |
| 2011/0096741 A1 | 4/2011 | Strahm et al. | |
| 2011/0191489 A1 | 8/2011 | Deshpande et al. | |
| 2012/0016678 A1 | 1/2012 | Gruber et al. | |
| 2012/0143863 A1 | 6/2012 | Tran | |
| 2012/0223885 A1 | 9/2012 | Perez | |
| 2014/0304418 A1 | 10/2014 | Torok et al. | |

FOREIGN PATENT DOCUMENTS

| | | |
|---|---|---|
| JP | 2006172241 | 6/2006 |
| JP | 2007515819 | 6/2007 |
| JP | 2007293444 | 11/2007 |
| WO | WO2006074023 | 7/2006 |
| WO | WO2011088053 A2 | 7/2011 |

OTHER PUBLICATIONS

Chinese Office Action dated Jun. 21, 2017 for Chinese Patent Application No. 201480032600.4, a counterpart foreign application of U.S. Appl. No. 13/858,753.

European Office Action dated Nov. 13, 2017 for European Patent Application No. 14782521.0, a counterpart foreign application of U.S. Pat. No. 9,781,214, 6 pages.

Translated Japanese Office Action dated May 16, 2017 for Japanese Patent Application No. 2016-507592, a counterpart foreign application of U.S. Pat. No. 9,781,214, 12 pages.

Partial Supplementary European Search Report dated Oct. 24, 2016 for European Patent Application No. 14782521.0, 8 pages.

Japanese Office Action dated Dec. 20, 2016 for Japanese Patent Application No. 2016-507592, a counterpart foreign application of U.S. Appl. No. 13/858,753, 11 pages.

Office action for U.S. Appl. No. 13/858,753, dated Feb. 2, 2016, Torok et al., "Load-Balanced, Persistent Connection Techniques", 23 pages.

Office action for U.S. Appl. No. 13/858,753, dated Jun. 17, 2016, Torok et al., "Load-Balanced, Persistent Connection Techniques", 24 pages.

Office action for U.S. Appl. No. 13/858,753 , dated Sep. 9, 2016, Torok et al., "Load-Balanced, Persistent Connection Techniques", 28 pages.

PCT Search Report and Written Opinion dated Sep. 4, 2014 for PCT Application No. PCT/US14/33210, 9 Pages.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

Chinese Office Action dated Mar. 19, 2018 for Chinese patent application No. 201480032600.4, a counterpart foreign application of U.S. Pat. No. 9,781,214.

Translated Japanese Office Action dated Apr. 17, 2018 for Japanese Patent Application No. 2016-507592, a counterpart foreign application of U.S. Pat. No. 9,781,214, 7 pages.

European Examination Report dated Oct. 31, 2018, for European Patent Application No. 14782521.0, a counterpart foreign application of parent U.S. Pat. No. 9,781,214, 4 pages.

\* cited by examiner

LOAD-BALANCED, PERSISTENT CONNECTION TECHNIQUES

RELATED APPLICATIONS

This application is a divisional of U.S. application Ser. No. 13/858,753, filed Apr. 8, 2013, entitled "Load-Balanced, Persistent Connection Techniques", which is incorporated herein by reference in its entirety.

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes, in part, techniques for creating a persistent connection between client devices and one or more remote computing resources, which may form a portion of a network-accessible computing platform. This connection may be considered "permanent" or "nearly permanent" to allow the client device to both send data to and receive data from the remote resources at nearly any time. Because the client devices need to be able to send and/or receive data at any time, these "permanent" or nearly permanent" connections may be established upon the client devices being powered on. That is, when each client device is powered on, the respective client device may attempt to establish a connection with the network-accessible computing platform.

In order to create such a connection, a client device described herein may be configured to request a connection to a virtual internet protocol (VIP) address. Because the remote computing resources may service a great number of client devices, the client devices may be preconfigured to connect to a particular one of a number of different VIP addresses, each of which may correspond to multiple IP addresses of server instances of the network-accessible computing platform.

When a client device requests a connection by calling the VIP address associated with the particular client device, the request may be received by a load-balancing service associated with the VIP. This service may then identify which IP addresses correspond to the VIP, and may select one of the IP addresses (and, hence, one of the server instances) to which to route the request. By doing so, load-balancing service may balance load across the server instances. The client device thereafter establishes a connection to the server instance associated with the selected IP address, although to the client it appears as if it has simply established a connection with the VIP address itself.

After a single connection has been established between the client device and the remote computing resources, the client device and/or the remote computing resources may create one or more virtual channels across the connection, which may be bilateral, such that communications may be sent in one or both directions in some instances. For instance, the client device may establish a first virtual channel for uploading a first audio signal to the remote computing resources, while the remote computing resources may establish a second virtual channel for sending an audio signal to the client device and for output by the client device. The data sent via these virtual channels may be multiplexed on a per-frame or multiple-frame basis such that bi-directional communications appear to be sent in parallel. For instance, a first frame of the connection may be used to send data to the remote computing resources via the first virtual channel, a second frame may be used to send data to the client device via the second virtual channel, and so forth. By multiplexing multiple virtual channels, it appears to both the client device and the remote computing resources that each virtual channel is a distinct connection, although only a single connection exists between the client device and the remote computing resources. By utilizing a single connection rather than multiple connections, the cost of coupling the client device and the remote computing resources is lessened.

In addition, after a client device connects to a server instance of the remote computing resources, the server instance or the load-balancing service may register, at a device-location service, an indication of which client device the instance has connected with. For instance, upon a client device establishing a connection with a server instance having a particular IP address, the server instance may store an indication of a device identifier (DID) of the client device in a table maintained by a device-location service. The table that the device-location service maintains may store a mapping of DIDs to IP addresses. By doing so, when another server instance of the remote computing resources is to send data intended for a particular client device, this server instance may identify, from the mapping, the server instance that is connected to the desired client device. The other server instance may then provide the data to the server instance maintaining the connection, such that the latter server instance can in turn provide the data to the client device.

In addition, the connection between a client device and a server instance may be dropped and a subsequent connection may be re-established in instances where no data, or less than a threshold amount of data, is exchanged between the client device and the server instance for a certain amount of time. For instance, the client device may be configured to sever a connection between itself and the remote computing resources if the client device neither received nor sent data to the server instance to which it connects for a threshold amount of time. Thereafter, the client device may again establish a connection with the remote computing resources by calling the VIP address associated with the client device. Again, the load-balancing service may receive the request and route the request to establish a connection between the client device and, potentially, a different server instance associated with the VIP address.

In addition, if the client device does not sever the connection after the threshold amount of time, the server instance may be configured to sever the connection after a second threshold amount of time that is slightly greater than the first threshold. In this instance, the server instance acts as a failsafe in the event that the client device fails to sever the connection. Upon realizing that the connection has been dropped (due to the server instance severing the connection), the client device may thereafter call the VIP address to establish a new connection.

While the above example describes severing the connection when less than a threshold amount of data is exchanged between the client device and the server instance over a period of time, the connection may be severed for multiple other reasons. For instance, the connection may be severed simply based on an amount of time of the connection (e.g., fifteen minutes after establishing the connection), an amount of data sent from the client device to the server instance over a period of time, an amount of data sent from the server instance to the client device over a period of time, in response to a physical server hosting the instance shutting down, if a client device fails to authenticate but requests data from the server instance, or if the processing load on the physical server hosting the instance is too great. In other examples, the client device or the server instance may sever the connection if the traffic between these two entities is too slow, if the bandwidth is too limited, if the quality of the connection is poor, or the like. In still other examples, the server instance may sever connections made with client devices associated with IP addresses that have been determined to be malicious, if a client device doesn't authenticate within a certain amount of time, if a client device sends something other than an authentication request as an initial request, or the like. While a few examples have been provided, it is to be appreciated that client devices and/or server instances may sever these connections for an array of different reasons.

The devices and techniques introduced above may be implemented in a variety of different architectures and contexts. One non-limiting and illustrative implementation is described below. While this implementation illustrates the client device as a voice-controlled device, it is to be appreciated that, in other implementations, the client device(s) may comprise mobile phones, tablet computing devices, laptop computers, desktop computers, electronic book reader devices, and/or the like.

Figure 1:
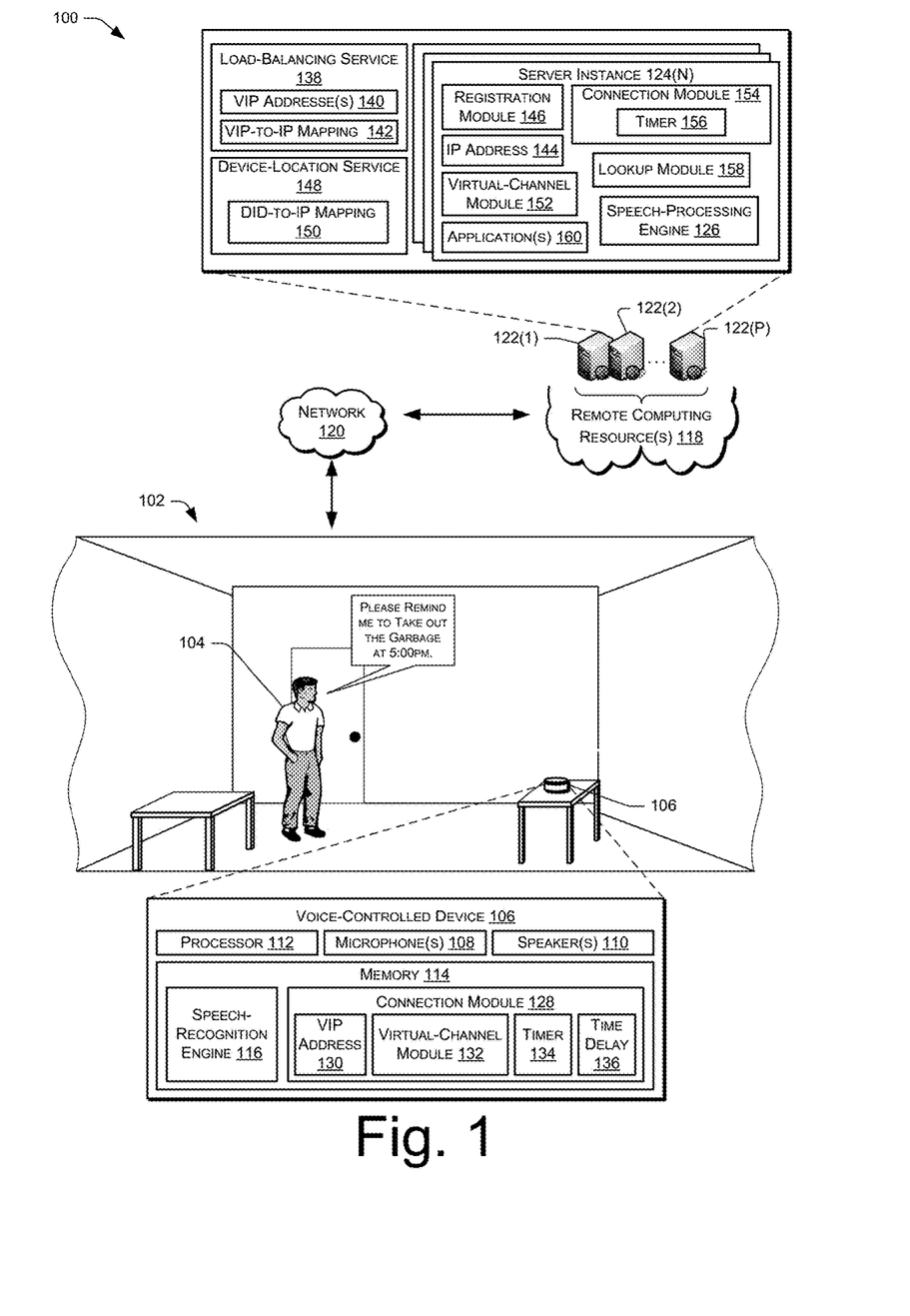
FIG. 1 shows an illustrative voice interaction computing architecture set in a home environment. The architecture includes a voice-controlled device physically situated in the home and communicatively coupled to remote computing resources.

FIG. 1 shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room of the home environment 102. In other implementations, it may be placed or mounted in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has a microphone unit comprising at least one microphone 108 and a speaker unit comprising at least one speaker 110 to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 6.

The microphone 108 of the voice-controlled device 106 detects audio from the environment 102, such as sounds uttered from the user 104. As illustrated, the voice-controlled device 106 includes a processor 112 and memory 114, which stores or otherwise has access to a speech-recognition engine 116. As used herein, a processor may include multiple processors and/or a processor having multiple cores. The speech-recognition engine 116 performs speech recognition on audio signals generated based on sound captured by the microphone, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema.").

In some instances, the voice-controlled device 106 may operate in conjunction with or may otherwise utilize computing resources 118 that are remote from the environment 102. For instance, the voice-controlled device 106 may couple to the remote computing resources 118 over a network 120. As illustrated, the remote computing resources 118 may be implemented as one or more servers 122(1), 122(2), . . . , 122(P) and may, in some instances, form a portion of a network-accessible computing platform implemented as a computing infrastructure of processors, storage, software, data access, and so forth that is maintained and accessible via a network such as the Internet. The remote computing resources 118 do not require end-user knowledge of the physical location and configuration of the system that delivers the services. Common expressions associated for these remote computing resources 118 include "on-demand computing", "software as a service (SaaS)", "platform computing", "network-accessible platform", "cloud services", "data centers", and so forth.

The servers 122(1)-(P) may include processor(s) and memory. As illustrated, the servers 122(1)-(P) may maintain one or more server instances 124(1)-(N). Each physical server may maintain one or more server instances, and each server instance may be configured to maintain a connection with one or more client devices, such as the voice-controlled device 106. In this example, the server instance 124(N) maintains a connection with the voice-controlled device. As illustrated, the example server instance 124(N) may store and utilize a speech-processing engine 126 for receiving audio signals from the device 106, recognizing speech and, potentially, causing performance of an action in response. For instance, the engine 126 may identify speech within an audio signal by performing natural language understanding (NLU) techniques on the audio signal. In addition, the engine 126 may provide audio for output on a client device (e.g., the device 106) via text-to-speech (TTS). In some examples, the voice-controlled device 106 may upload audio data to the server instance 124(N) for processing, given that the server instance 124(N) may have a computational capacity that far exceeds the computational capacity of the voice-controlled device 106. Therefore, the voice-controlled device 106 may utilize the speech-processing engine 126 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 118 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth. In some instances, the device 106 also interacts with a client application stored on one or more client devices of the user 104. In some instances, the user 104 may also interact with the device 104 through this "companion application". For instance, the user 104 may utilize a graphical user interface (GUI) of the companion application to make requests to the device 106 in lieu of voice commands. Additionally or alternatively, the device 106 may communicate with the companion application to surface information to the user 104, such as previous voice commands provided to the device 106 by the user (and how the device interpreted these commands), content that is supplementary to a voice command issued by the user (e.g., cover art for a song playing on the device 106 as requested by the user 104), and the like. In addition, in some instances the device 106 may send an authorization request to a companion application in response to receiving a voice command, such that the device 106 does not comply with the voice command until receiving permission in the form of a user response received via the companion application.

The voice-controlled device 106 may communicatively couple to the network 120 via wired technologies (e.g., wires, USB, fiber optic cable, etc.), wireless technologies (e.g., WiFi, RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies.

As illustrated, the memory 114 of the voice-controlled device 106 also stores or otherwise has access to the speech-recognition engine 116 and a connection module 128. The connection module 128 functions to establish a connection to one of the server instances 124(1)-(N). As illustrated, the connection module 128 is preconfigured to call a particular VIP address 130. A manufacturer of the device 106 and other devices may configure each device with one of multiple VIP addresses, each of which maps to one or more IP addresses of respective server instances. By varying the VIP addresses assigned to the client devices, such as the voice-controlled device 106, the load assigned to the server instances may be balanced as discussed below.

The connection module 128 also includes a virtual-channel module 132, a timer 134, and a preconfigured time delay 136, as described in detail below.

In order to create a connection with the remote computing resources (e.g., upon power up of the device 106), the connection module 128 may call the preconfigured VIP address 130, which corresponds to a server of a load-balancing service 138 of the remote computing resources 118. The load-balancing service 138 functions to distribute load across the server instances 124(1)-(N) by routing connection requests to different instances associated with each VIP address. As illustrated, the load-balancing service 138 corresponds to one or more VIP addresses 140, including the VIP address 130, and also stores a VIP-to-IP mapping 142. The VIP-to-IP mapping 142 indicates which server-instance IP addresses correspond to which VIPs (preconfigured on client devices, such as the device 106). As such, when the device 106 issues the connection request using the VIP address 130, the load-balancing service 138 identifies which IP addresses correspond to this VIP address 130. The service 138 then selects one of these IP addresses and routes the connection request to the corresponding server instance, such as the server instance 124(N) in this example. While the mapping 142 indicates that the server instances are identified by their IP addresses in this example, in other implementations these instances may be identified by their respective hostnames or via other identifying information in other embodiments.

As illustrated, the example server instance 124(N) includes an IP address 144 and a registration module 146. Upon the device 106 establishing a connection with the server instance 124(N), the registration module 146 may indicate this connection to a device-location service 148. The device-location service 148 includes a device identifier (DID)-to-IP mapping 150, which maps which client devices are connected to which server instances. Again, while the mapping 150 indicates that the server instances are identified by their IP addresses in this example, in other implementations these instances may be identified by their respective hostnames or via other identifying information in other embodiments.

As such, when a server instance has data to send to a particular client device, but is not directly connected to the particular client device, the server instance may lookup which server instance maintains the connection with the client device and may provide this data to the corresponding instance. The server instance that receives the data may, in turn, provide the data to the particular client device. While this example describes the registration module 146 of the server instance 124(N) registering this information at the device-location service 148, in other instances the load-balancing service 138 or another entity may send this information to the device-location service 148.

As illustrated, the server instance 124(N) also includes a virtual-channel module 152. The virtual-channel module 132 (on the voice-controlled device 106) and the virtual-channel module 152 each function to create one or more virtual channels over the connection once the device 106 has established such a connection with the server instance 124(N). For instance, if the device 106 generates an audio signal (e.g., based on sound detected by the microphone 108, etc.), the virtual-channel module 132 may create a virtual channel for sending the audio signal to the server instance 124(N). Similarly, if the server instance 124(N) has data to send to the client device (e.g., an audio signal for output on the speaker 110, a control message to control a component of the device 106, etc.), the virtual-channel module 152 may create a virtual channel for sending this data to the device 106.

In some instances, the data sent over multiple virtual channels of the single connection may be multiplexed. For example, the connection may implement a protocol that iterates, on a per-frame or multiple-frame basis, between the sending of data over the virtual channels. For example, a first virtual channel may send data during a first frame, a second virtual channel during a second frame, and so forth.

The server instance 124(N) may also include a connection module 154, which also includes a timer 156. The connection module 154 functions to maintain a connection to the voice-controlled device 106 (and perhaps, simultaneously, multiple other client devices). Returning to the timer 134 of the voice-controlled device 106, the timer 134 functions to measure an amount of time that the device 106 stays connected to a server instance, an amount of time that data is neither received from nor sent to the server instance 124(N) (from the voice-controlled device 106), or the like. After the timer 134 indicates that no data (or an amount of data that is less than a threshold) has been sent or received for a threshold amount of time, the connection module 128 may sever the connection with the server instance 124(N). Thereafter, the connection module 128 may again attempt to create a connection, waiting an amount of time indicated by the time delay 136 prior to attempting to make this connection. The time delay 136, which may be preconfigured for the device 106, may indicate to the module 132 to wait a certain amount of time that includes a certain degree of randomness. For instance, the time delay 136 may indicate that after losing or severing a connection with a server instance, the module 132 should first attempt to reconnect after one second, plus or minus a half of a second. If that attempt is unsuccessful, then the time delay 136 may indicate that the module 132 should wait two seconds, plus or minus a second. The preconfigured degree of randomness, and hence the time delay 136, may vary across client devices. By varying the time delays in this manner, if one server hosting multiple server instances goes offline (e.g., due to maintenance, malfunction, or the like), then the varied time delays ensure that each client device connected to a server instances hosted on that server will not attempt to reconnect to the remote computing resources 118 at the exact same time, which may result in an undesired load at a given instant.

The timer 156 of the connection module 154, meanwhile, may function similar to the timer 134. For example, the timer 156 may measure an amount of time that data is neither sent to nor received from the voice-controlled device 106. After a threshold amount of time, the timer 156 may instruct the connection module 154 to sever the connection with the device 106. In some examples, the timer 134 may be set to sever the connection prior to the timer 156, such that the timer 156 acts as a fail-safe in the event that the connection module 128 does not succeed in severing the connection after the threshold amount of time (associated with the timer 134) elapses. For example, the connection module 128 may be configured to sever the connection if no data is sent nor received after fourteen minutes, while the connection module 154 may be configured to sever the connection if no data is sent nor received after fifteen minutes and the client device has yet to sever the connection. Of course, in other implementations, this protocol may be reversed.

FIG. 1 additionally illustrates that the server instance 124(N) may include a lookup module 158. As described above, in some instances the server instance 124(N) may have data to send to another client device to which it does not connect. The lookup module 158 may function to look up the IP address corresponding to the DID of the client device for which the instance 124(N) has data. After determining this information from the mapping 150, the server instance 124(N) may provide the data to the appropriate server instance, which may in turn provide the data to the client device.

Finally, FIG. 1 illustrates that the example server instance 124(N) includes one or more applications 160. An application may interact with a client device, such as the voice-controlled device 106, in any number of ways. For instance, the application(s) 160 may include a reminder application that provides audio for output at the device 106 reminding the user 104 to perform a particular task (e.g., buy milk), an application that sends music for output at the device 106, or the like. In some instances, an application stored on a particular server instances utilizes the lookup module 158 to determine which server instance of the remote computing resources 118 a particular client device is connected with. By doing so, the application is able to provide certain content (e.g., a reminder) to this client device. Furthermore, while FIG. 1 illustrates the application 160 as residing on the server instance 124(N), in other implementations the application 160 (and other applications) may additionally and/or alternatively reside on other servers or third-party servers.

Figure 2:
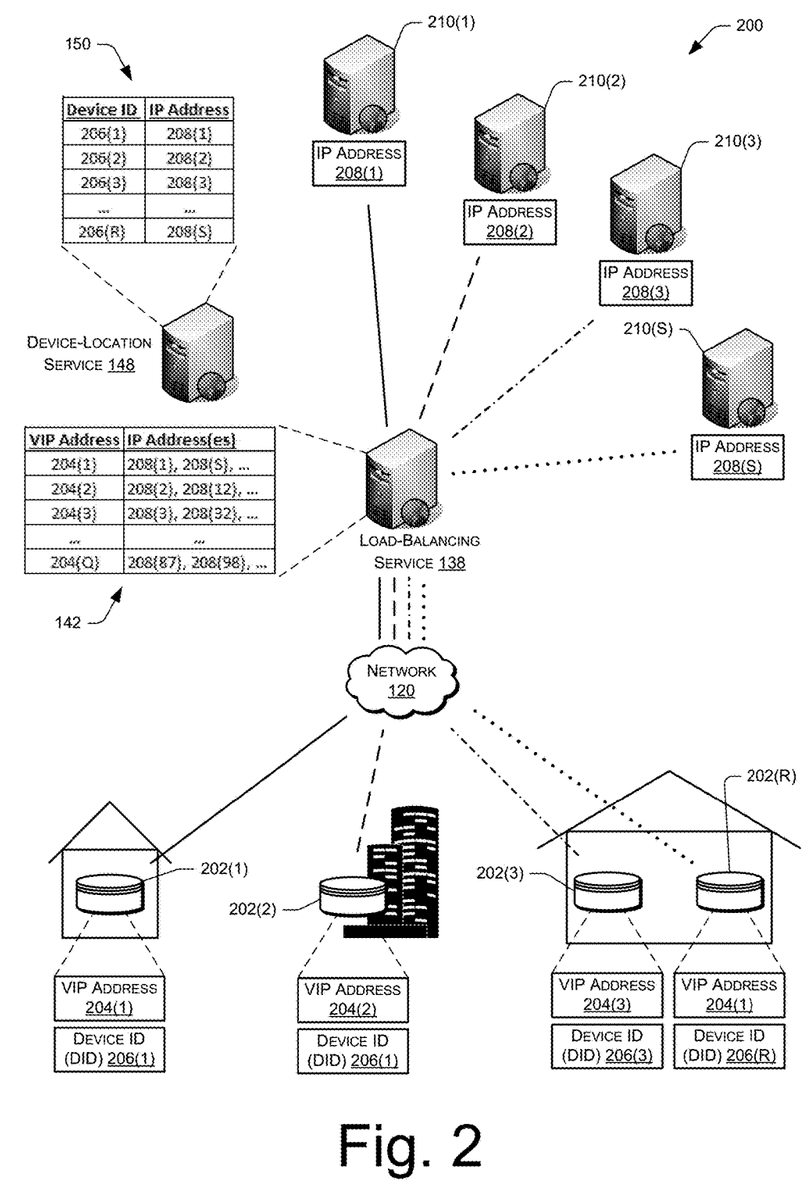
FIG. 2 illustrates the architecture of FIG. 1 in additional detail. As illustrated, each voice-controlled device connects to the remote computing resources via a load-balancing service that routes connection requests to different server instances.

FIG. 2 illustrates additional details of an example 200 of the architecture 100. In this example, the example architecture 200 includes voice-controlled devices 202(1), 202(2), 202(3), . . . , 202(R). Each of these devices has been preconfigured to establish a connection by calling a particular VIP address. For instance, the device 202(1) has been configured to call a VIP address 204(1), the device 202(2) has been configured to call a VIP address 204(2), the device 202(3) has been configured to call a VIP address 204(3), and the device 202(R) has been configured to also call the VIP address 204(1). In addition, each device 202(1)-(R) is associated with a respective device ID (DID) 206(1), 206(2), . . . , 206(R), which may comprise a serial number of the device or the like.

As illustrated, the load-balancing service 138 maps each VIP address 204(1)-(Q) to one or more corresponding IP addresses 208(1), 208(2), 208(3), . . . , 208(S) corresponding to respective server instances 210(1), 210(2), 210(3), . . . , 210(S). The load-balancing service 138 also receives the connection requests from the client devices 202(1)-(R), with these requests addressed to a particular VIP address. The service 138 then maps this information to the corresponding IP addresses and selects an IP address to which to route the request. In this example, given the varying VIP addresses that the devices 202(1)-(R) are associated with, the client device 202(1) connects with the server instance 210(1), the client device 202(2) connects with the server instance 210(2), the client device 202(3) connects with the server instance 210(3), and the client device 202(R) connects with the server instance 210(S). After a client device establishes a connection with a server instance, the respective server instance stores an indication of that association at the device-location service 148, as illustrated and as discussed above.

Figure 3:
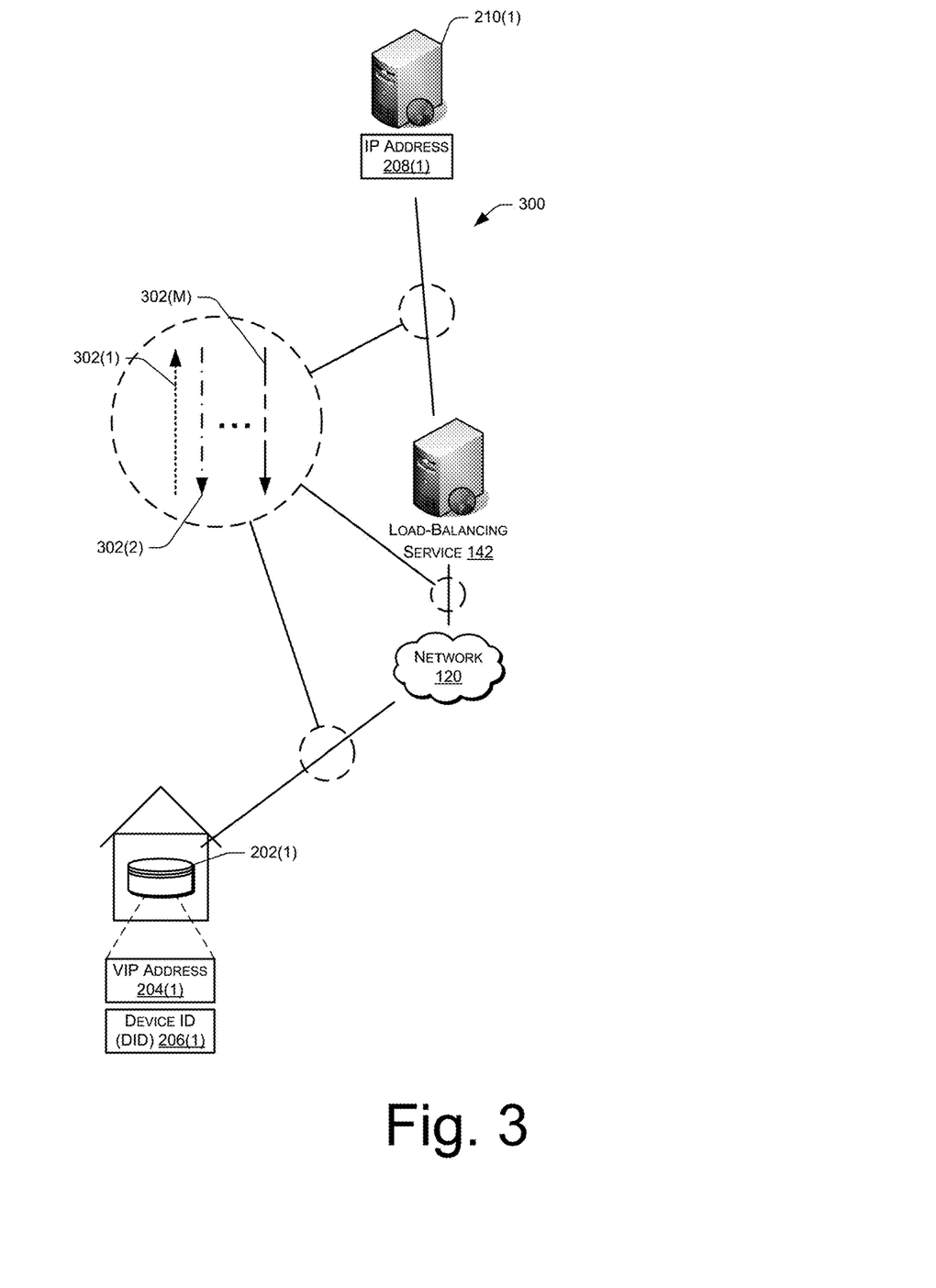
FIG. 3 illustrates an example connection between a voice-controlled device and a server instance of FIG. 2. This single physical connection includes multiple virtual channels, over which data sent to and received by the client device may be multiplexed.

FIG. 3 illustrates an example connection 300 between the voice-controlled device 202(1) and the server instance 210(1). As illustrated, multiple virtual channels 302(1), 302(2), . . . , 302(M) may be established over this single connection 300. The device 202(1) may establish a virtual channel in response to identifying that the device has data to send to the server instance 210(1). Similarly, the server instance 210(1) may establish a virtual channel in response to identifying that it has data to send to the device 202(1). As described above, the connection 300 may implement a protocol that multiplexes the data sent to and received by the client device. In this example, the device 202(1) sends data to the server instance 210(1) via the virtual channel 302(1), while the server instance 210(1) sends data to the device 202(1) via virtual channels 302(2) and 302(M). While FIGS. 1-3 illustrate the device 106 as connecting to a server instance through the load-balancing service 138, the device 106 may communicate directly with the server instance after the connection 300 is made (i.e., may bypass the service 138). In addition, while some embodiments implement a single connection between a client device and a server instance, in other embodiments multiple connections may be established (e.g., one for providing TTS to the client device, one for providing music to the device, one for uploading an audio signal from the device, etc.).

Figure 4:
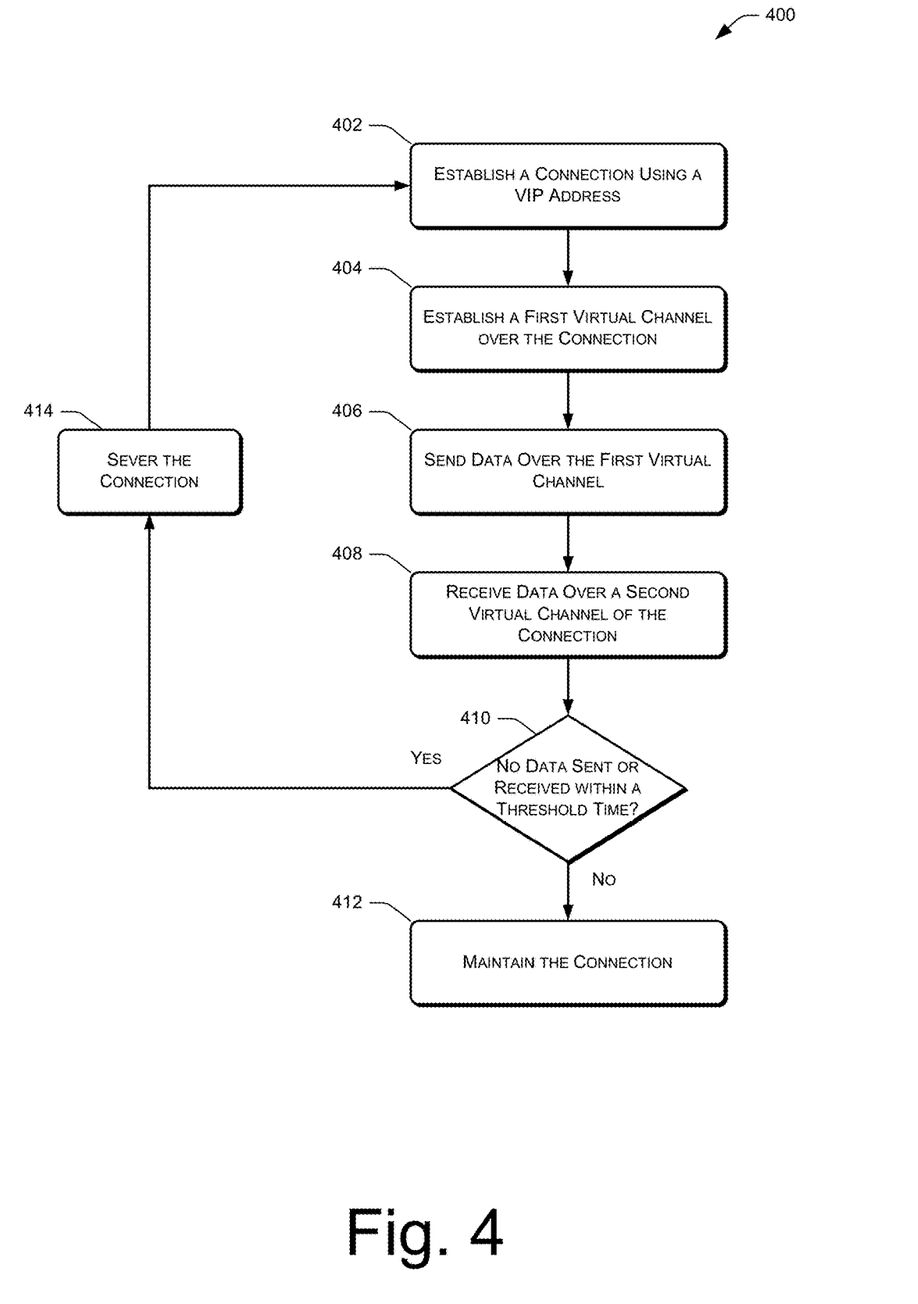
FIG. 4 depicts a flow diagram of an example process that a voice-controlled device of FIG. 1 or other client device may implement.

FIG. 4 depicts a flow diagram of an example process 400 that a voice-controlled device or another client device may implement. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 400 includes, at 402, a client device establishing a connection with a server instance of a network-accessible platform using a VIP address stored on the client device. After successfully establishing a connection, the client device may establish a first virtual channel over the connection at 404. At 406, the client device proceed to send data to the server instance over the first virtual channel and, at 408, may receive data from the server instance over a second virtual channel.

At 410, the client device may determine whether data has been neither sent nor received within a threshold amount of time. If not, meaning that at least some data has been sent or received within this amount of time, then at 412 the client device maintains the connection with the server instance. If so, however (meaning that no data has been sent nor received), then at 414 the client device severs the connection with the server instance. The client device then proceeds to re-establish a connection by calling the VIP address configured on the device. While FIG. 4 depicts one example for severing a connection between a client device and a server instance, as described above these connections may be severed for a variety of other reasons.

Figure 5:
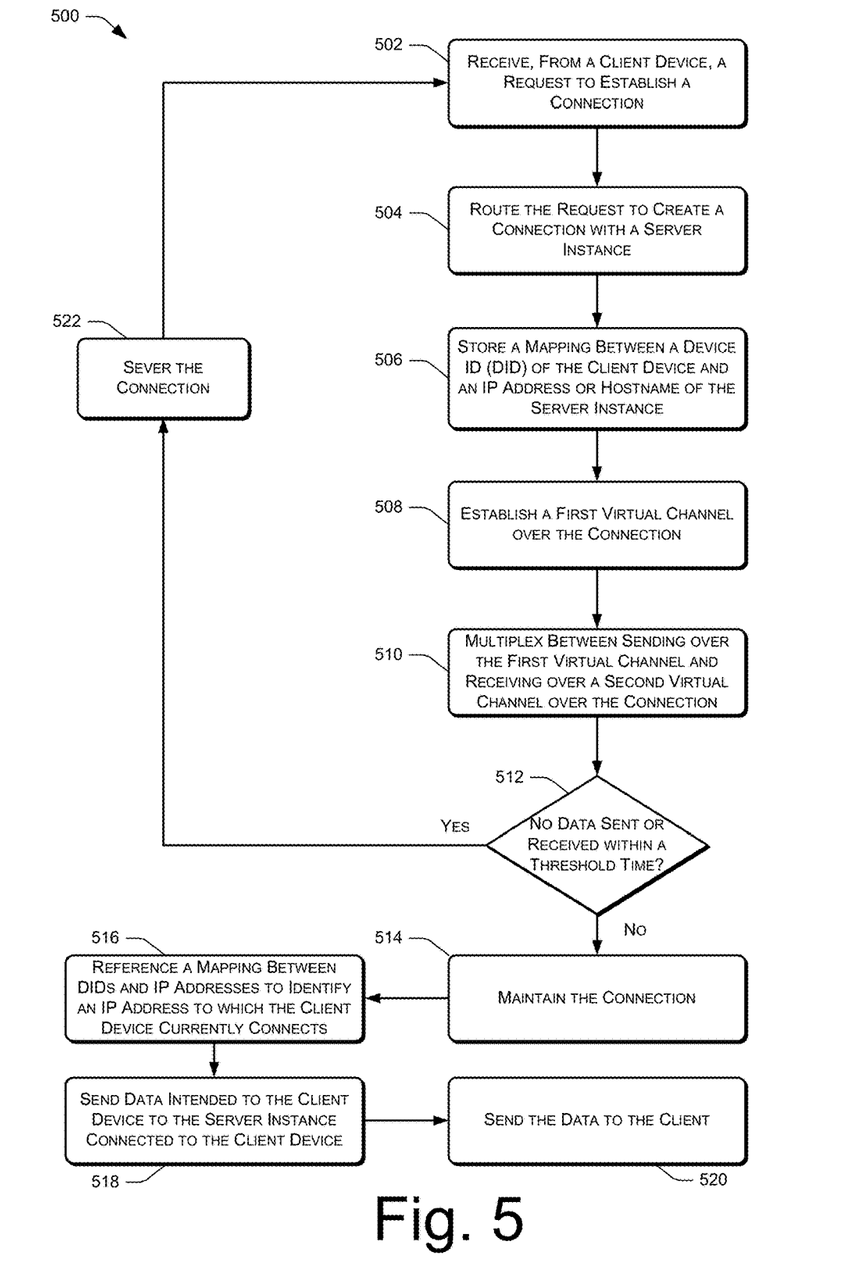
FIG. 5 depicts a flow diagram of an example process that the remote computing resources of FIG. 1 may implement.

FIG. 5 depicts a flow diagram of an example process 500 that the remote computing resources 118 may implement. This process 500 may be performed by a single server or across multiple servers of the resources 118. At 502, the resources 118 receive a request from a client device to establish a connection with the resources 118. At 504, the resources route the request to a server instance to create a connection with the server instance. For instance, the request may be received at a particular VIP address, which may be mapped to one or more IP addresses, after which an IP address of the one or more addresses may be selected. The request may then be routed to the server instance corresponding to the selected IP address.

At 506, the resources 118 store a mapping between a DID of the client device and the IP address of the server instance. In addition, the resources (e.g., the connected server instance) may establish a first virtual channel at 508. At 510, the resources (e.g., the protocol that the resources implement) may multiplex between sending data over the first virtual channel and receiving, from the client device, data over a second virtual channel.

At 512, the resources may determine whether data has been neither sent nor received within a threshold amount of time. If not, meaning that at least some data has been sent or received within this amount of time, then at 514 the resources (e.g., the server instance) maintain the connection with the client device.

In addition, and as discussed above, an application may have data to send to a client device. If so, then at 516 the application references a mapping between DIDs and IP addresses to identify an IP address to which server instance the client device is connected. At 518, the application then sends the data to the server instance associated with the identified IP address, which in turn sends this data to the appropriate client device. The depicted process 500 also illustrates, at 520, that the server instance may maintain the connection with the client device to which it connects, given that some data was determined, at 512, to have been sent or received between the client device and the server instance.

If, however, the server instance determines at 512 that no data has been sent or received for the threshold amount of time, and if the client device remains connected to the instance, then at 522 the server instance severs the connection with the client device. Some time thereafter, the remote computing resources may again receive a request from the same client device or a different client device to establish a connection with the resources. Again, while FIG. 5 depicts one example for severing a connection between a client device and a server instance, as described above these connections may be severed for a variety of other reasons.

Figure 6:
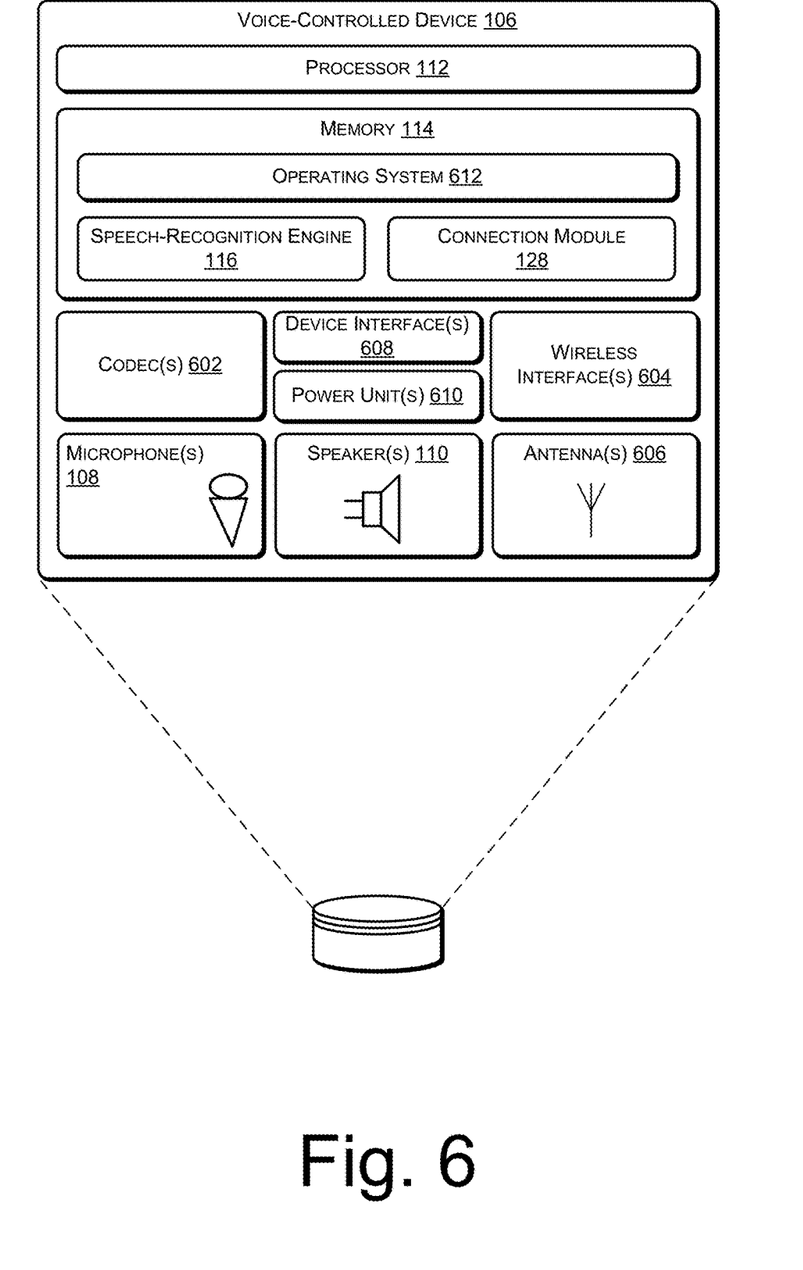
FIG. 6 shows a block diagram of selected functional components implemented in the voice-controlled device of FIG. 1.

FIG. 6 shows selected functional components of one implementation of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor 112 and memory 114. The memory 114 may include computer-readable storage media ("CRSM"), which may be any available physical media accessible by the processor 112 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 106 includes a microphone unit that comprises one or more microphones 108 to receive audio input, such as user voice input. The device 106 also includes a speaker unit that includes one or more speakers 110 to output audio sounds. One or more codecs 602 are coupled to the microphone(s) 108 and the speaker(s) 110 to encode and/or decode the audio signals. The codec may convert audio data between analog and digital formats. A user may interact with the device 106 by speaking to it, and the microphone(s) 108 captures sound and generates an audio signal that includes the user speech. The codec(s) 602 encodes the user speech and transfers that audio data to other components. The device 106 can communicate back to the user by emitting audible statements through the speaker(s) 110. In this manner, the user interacts with the voice-controlled device simply through speech, without use of a keyboard or display common to other types of devices.

In the illustrated example, the voice-controlled device 106 includes one or more wireless interfaces 604 coupled to one or more antennas 606 to facilitate a wireless connection to a network. The wireless interface(s) 604 may implement one or more of various wireless technologies, such as wife, Bluetooth, RF, and so on.

One or more device interfaces 608 (e.g., USB, broadband connection, etc.) may further be provided as part of the device 106 to facilitate a wired connection to a network, or a plug-in network device that communicates with other wireless networks. One or more power units 610 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on or to indicate when a command is received. But, otherwise, the device 106 does not use or need to use any input devices or displays in some instances.

Several modules such as instruction, datastores, and so forth may be stored within the memory 114 and configured to execute on the processor 112. An operating system module 612 is configured to manage hardware and services (e.g., wireless unit, Codec, etc.) within and coupled to the device 106 for the benefit of other modules. In addition, the memory 114 may include the speech-recognition engine 116 and the connection module 128.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
    one or more processors; and
    one or more computer-readable media storing computer-executable instructions that, when executed by the one or more processors, cause the one or more processors to perform acts comprising:
        receiving, from a client device, a first request to connect to one or more of multiple server instances;
        establishing a first connection between the client device and a first server instance of the multiple server instances at least partly in response to receiving the first request;
        dropping the first connection at least partly based on an amount of data transferred between the client device and the first server instance over a period of time;
        receiving, from the client device, a second request to connect to one or more of the multiple server instances; and
        establishing a second connection, between the client device and a second server instance of the multiple server instances, based at least partly on dropping the first connection.

2. The system as recited in claim 1, the acts further comprising, prior to the dropping, iterating between sending data over a first channel of the first connection and receiving data over a second channel of the first connection.

3. The system as recited in claim 1, the acts further comprising storing an indication that the client device has established the first connection with the first server instance, the indication comprising a device identifier (DID) associated with the client device and an identifier of the first server instance.

4. The system as recited in claim 1, wherein:
    dropping the first connection at least partly based on an amount of data transferred between the client device and the first server instance over a period of time comprises dropping the first connection when no data has been transferred between the client device and the first server instance for 15 minutes; and
    establishing the second connection comprises establishing the second connection based at least partly on receiving the second request.

5. One or more computing devices comprising:
    one or more processors; and
    one or more computer-readable media storing computer-executable instructions that, when executed by the one or more processors, cause the one or more processors to perform acts comprising:
        receiving, from a client device, a request to connect to one or more of multiple server instances;

routing the request such that the client device establishes a first connection with a first server instance of the multiple server instances;
severing the first connection based on at least one of a property of the first connection, a property of the first server instance, or a property of the client device; and
establishing a second connection, between the client device and a second server instance of the multiple server instances, based at least partly on severing the first connection.

6. The one or more computing devices as recited in claim 5, wherein the severing is based at least in part on the property of the first connection, the property of the first connection comprising an amount of data sent to the client device from the first server instance or received by the first server instance from the client device over a period of time.

7. The one or more computing devices as recited in claim 5, wherein the severing is based at least in part on the property of the first server instance, the property of the first server instance comprising an indication that a physical server hosting the first server instance is being shut down.

8. The one or more computing devices as recited in claim 5, wherein:
the request is received by a load-balancing service that is associated with a virtual internet protocol (VIP) address called by the client device,
the load-balancing service selects the second server instance for establishing the second connection, and
establishing the second connection between the client device and the second server instance substantially balances a processing load across the multiple server instances.

9. The one or more computing devices as recited in claim 5, wherein the severing is based at least in part on the property of the client device, the property of the client device being that the client device is not authorized to connect to the first server instance.

10. The one or more computing devices as recited in claim 5, the acts further comprising storing an indication that the client device has established the first connection with the first server instance, the indication comprising a device identifier (DID) associated with the client device and an identifier associated with the first server instance.

11. The one or more computing devices as recited in claim 10, the acts further comprising:
accessing the indication to obtain the identifier associated with the first server instance;
sending data to the first server instance, the data intended for the client device; and
sending, by the first server instance, the data to the client device.

12. The one or more computing devices as recited in claim 11, wherein the data comprises an audio signal for output on a speaker of the client device.

13. The one or more computing devices as recited in claim 11, wherein the data comprises a control message instructing the client device to perform an operation.

14. The one or more computing devices as recited in claim 5, the acts further comprising:
establishing a first channel of the first connection over which to send data to the client device; and
receiving data from the client device over a second channel of the first connection.

15. The one or more computing devices as recited in claim 5, wherein the the client device comprises a voice-controlled device, and wherein the request is generated by the client device based at least in part on a voice command received by the client device.

16. A method comprising:
receiving, by a computing device and from a client device, a request to connect to one or more of multiple server instances;
at least partly in response to receiving the request, establishing, by the computing device, a first connection between the client device and a first server instance of the multiple server instances;
dropping, by the computing device, the first connection based on at least one of a property of the first connection, a property of the first server instance, or a property of the client device; and
based at least in part on dropping the first connection, establishing a second connection between the client device and a second server instance of the multiple server instances different from the first server instance, wherein the second server instance is selected for establishing the second connection to substantially balance a processing load across the multiple server instances.

17. The method of claim 16, wherein the dropping is based at least in part on the property of the first connection, the property of the first connection comprises at least one of an amount of data transferred over the first connection over a period of time, an amount of time from establishing the first connection, or a bandwidth of the first connection.

18. The method of claim 16, wherein establishing the second connection includes permitting a variable amount of time to elapse between dropping the first connection and establishing the second connection.

19. The method of claim 16, further comprising:
measuring an amount of time within which an amount of data transferred over the first connection is below a threshold amount of data;
determining that the amount of time is greater than a first threshold amount of time, and is equal to a second threshold amount of time, and
dropping the first connection based at least in part on the determining.

20. The method of claim 16, further comprising:
iterating between sending data over a first channel of the first connection and receiving data over a second channel of the first connection.

* * * * *